Figure 3:
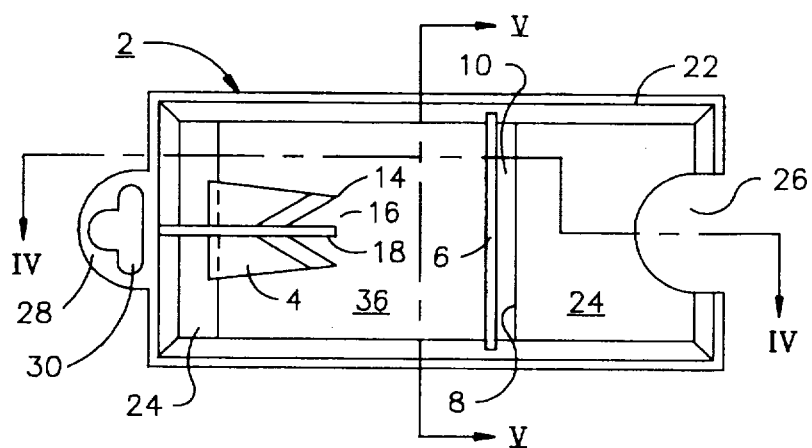

United States Patent
Rydgerg

[11] Patent Number: 5,515,642
[45] Date of Patent: May 14, 1996

[54] TRAP

[76] Inventor: Sverker Rydgerg, Nackebo Gard, S-590 20 Mantorp, Sweden

[21] Appl. No.: 90,206
[22] PCT Filed: Jul. 2, 1990
[86] PCT No.: PCT/SE90/00472
  § 371 Date: Feb. 26, 1993
  § 102(e) Date: Feb. 26, 1993
[87] PCT Pub. No.: WO92/00008
  PCT Pub. Date: Jan. 9, 1992
[51] Int. Cl.⁶ ............................................. A01M 23/24
[52] U.S. Cl. ............................ 43/85; 43/77; 43/81; 43/82
[58] Field of Search .......................... 43/77, 63, 85, 43/86, 81, 82, 88

[56] References Cited

U.S. PATENT DOCUMENTS

| | | | |
|---|---|---|---|
| 1,061,304 | 5/1913 | May | 43/82 |
| 1,422,049 | 7/1922 | Gould | 43/82 |
| 1,726,694 | 9/1929 | Cooper | 43/85 |
| 1,795,806 | 3/1931 | Swann | 43/81 |
| 2,222,653 | 11/1940 | Chambless | 43/85 |
| 2,510,655 | 6/1950 | Price | 43/85 |
| 2,869,280 | 1/1959 | Dobratz | 43/77 |
| 4,122,625 | 10/1978 | Ohtsuka | 43/85 |
| 4,308,682 | 1/1982 | Cesar | 43/77 |
| 4,918,855 | 4/1990 | Simpson | 43/77 |
| 5,010,682 | 4/1991 | Saccon | 43/77 |

Primary Examiner—Kurt Rowan
Attorney, Agent, or Firm—Howson and Howson

[57] ABSTRACT

A trap for small noxious animals, such as mice, and comprising a holder (1) in form of a frame for holding a tightening element (3) in form of a shield. The trap (1) is arranged to be able to take a first, non-tightening position and at least a second, tightening position (12). The holder (1) shows a support (4) for a bait (20). The element (3), consisting of a sheet-metal, shows a setting-tongue (5) cut in the element (3), which tongue is arranged preloaded in the trap (1). In the said first position of the trap (1), the setting-tongue (5) is arranged at a distance from the support (4) and in the said second position (12) of the trap (1), an end portion (7) of the setting-tongue (5) is arranged to extend over the outer end (14) of the support (4) and touch the bait (20), while a second end portion (9) of the setting-tongue (5) is arranged to touch a stop in the holder (2). The trap (1) can be arranged in the said second position (12) or a setting-position by the fact that the element (3) is brought to take a bent position in the holder (2) and by that tightened and for the trap (1) releaseable position, whereby simultaneously the setting-tongue (5) is brought to touch the bait (20) and the said stop in the holder (2). During consumption of the bait (20), the setting-tongue (5) change position and when the setting-tongue has reached a predestinated position, the trap (1) release by the fact that the element (3) is strived to return to its said first position.

2 Claims, 4 Drawing Sheets

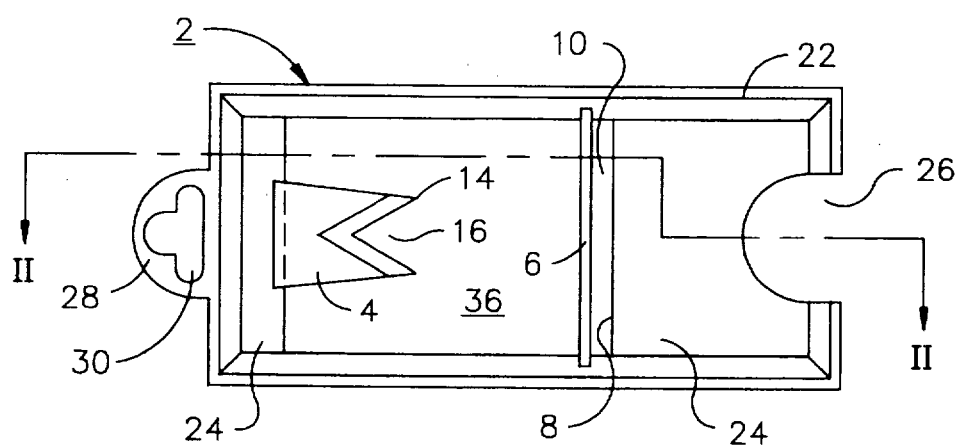
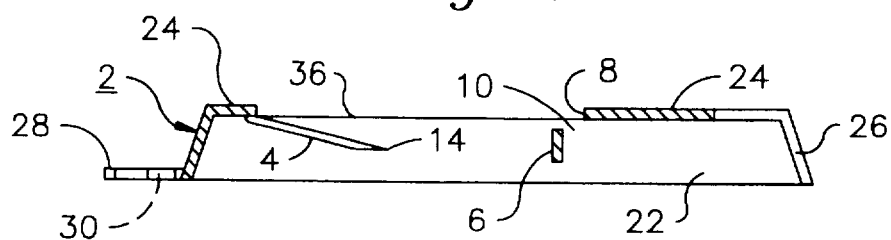
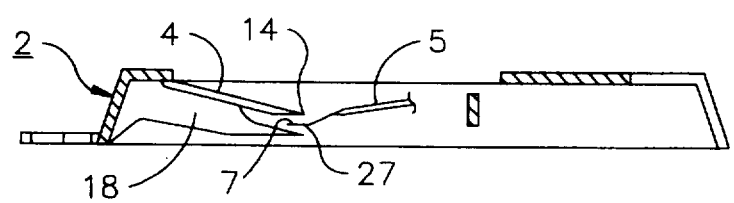
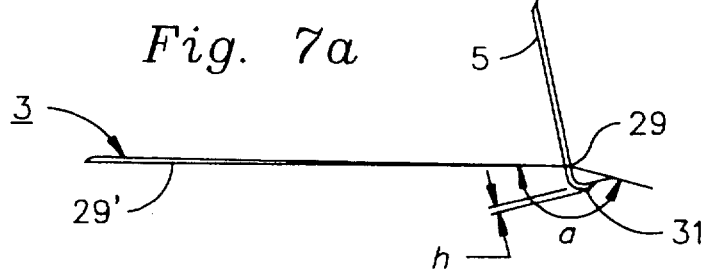

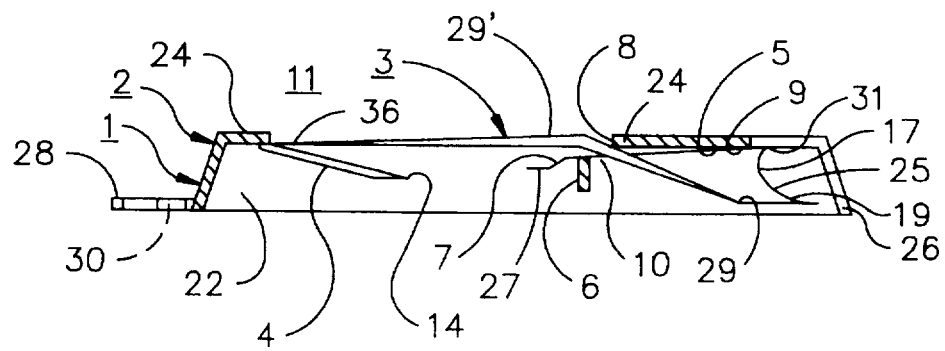
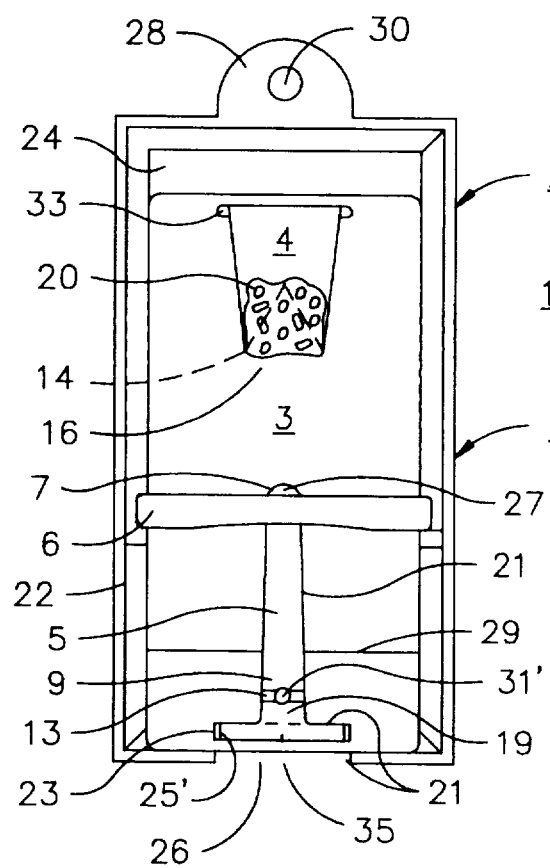
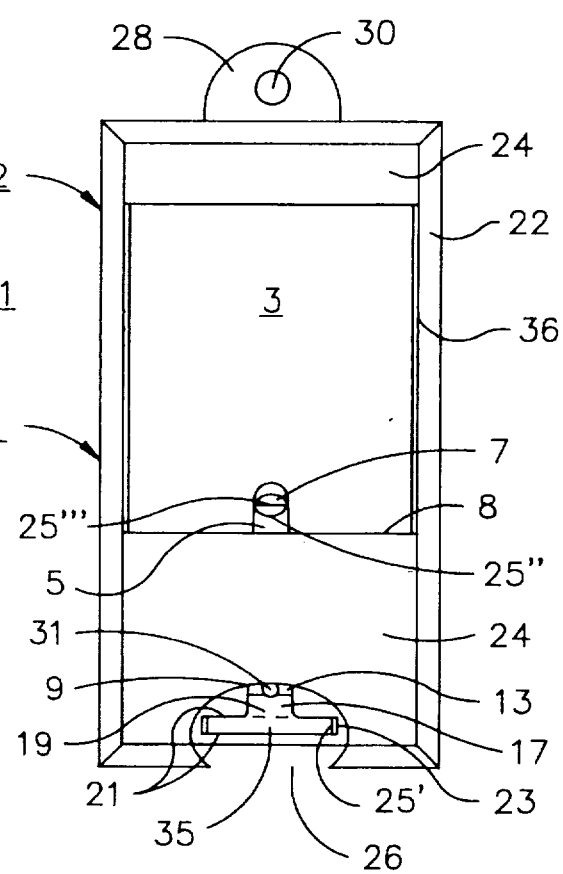

TRAP

The present invention relates to a trap, which preferably is meant for small animals doing harm, such as mice, and comprises a support for bait and a framework, a base, a frame or similar, which is arranged to be able to hold a setting element of a material able to be tightened or an elastic material, and further a trigger, which is connected with the said element and in the trap arranged at a distance from the bait-support. The trap is arranged to be able to take a first, resting, position and at least a second, tightened, position.

There is a need of a new trap, which is simpler to handle and set, can be cleared of a trapped animal in an easier way and reduces or eliminates the risk of infections at the same time as the trap will be kind to animals by the fact that killing can be done rapidly or immediately, i.e. without any risk that the animal will suffer. Besides, a trap should be able to be produced in a simple way and at a low cost.

Known traps of the kind in question are often difficult to handle and set for everybody and have generally unsatisfactory function, especially in reutilization as the trap is deformed when used, whereby it can be almost impossible to set and loses the capacity to kill the animal resulting in unnecessarily suffering. Furthermore, the traps are often unpleasant to clear as they deform and often also puncture the animal. These inconveniences together with the fact that the traps are not weather-resistant and neither can be cleaned in a satisfactory way make them unsuitable as trap means for vermin nevertheless as regards the risk of infections. Thus, it has been shown that, for example, mice who have consumed poison does not have been killed in a trap but succeeded in escaping from the trap as well and have moved to watercourses or wells before they have died, whereby risks of poisoning have arised for other animals and for people. Such traps consist of the common hit traps with a base plate of wood and a releaseable tightening bow. Such a trap needs to be cleaned with carefulness after use, which, however, is not easy to carry out. It has been proposed to replace the base plate of wood in these traps with a base plate of plastic material but the handling and the function of the traps have not been materially simplified and improved respectively, as well as neither the hygienic conditions.

A trap in accordance with the invention fulfils, however, the requirements made while, at the same time, the disadvantages of said known traps are eliminated. Thus, the trap is simple to handle and to set, to clear as well as the trapped animal will not be deformed or in another way be destroyed when trapped. Besides, the killing is totally bloodless. The fact is that the trap is shaped with regard to the anatomy of the vermin in question by that the trap and a setting element are shaped and dimensioned in such a way that the animal immediately is hit unconscious when the trap is released simultaneously as the vertebral column is broken at or after atlas, which leads to an assured and immediate killing of the animal. It has also been shown that the trap when it releases present a shock effect for the animal, who therefore never grasp the situation. As the killing is clean and the animal will not be deformed when it is killed, the trap is easy to examine and empty and the person examining the trap does not need to suffer of unpleasant sight and be plastered with dirt notwithstanding the fact that it concerns a mechanical working trap. As the trap certainly kill the animal and in a clean way and without deformation, the risks to spread infections and poisoning are also eliminated. Furthermore, the trap is easy to clean and is also possible to sterilize, if it is necessary. Besides, the trap is simple to manufacture and with a minimum of manual handling and assemblage, can be shaped of few parts or can consists of only two parts and therefore, the trap can be produced at a low cost, especially in larger series production. The trap is shaped of such materials that it hardly is worn out or is almost indestructible and weather-resistant so the trap can be reutilized without deteriorated function. Further, the trap has low weight and is stackable for keeping a stock and for transporation. The trap is kind to animals also in connection with other animals, who can come into contact with the trap and is safe for children and when one gets jammed in unsuccessful handling of the trap. A trap in accordance with the invention is thus characterized in that the trigger of the trap is arranged in the trap's first or resting position to be able to be moved in the direction of the bait-support to take the trap's second or setting position, whereby the trigger is arranged, with at least an end portion, to be able to rest on a bait or to overlap or reach beyond an outer end of the bait-support in the said second position of the trap. The setting element is arranged to be able to be kept in a tightened position in the said second position of the trap or in setting the trap and when the trap releases be able to be brought out of the tightened position.

According to an embodiment of the trap in accordance with the invention the trigger is put in a pressed or a preloaded position in the trap in the said first position of the trap.

In an another embodiment of the trap in accordance with the invention, the said setting element is essentially shaped as a plate-shaped element or a shield and that the trigger is shaped in one piece with the said element and arranged to reach in an angle to the element, whereby in attachment of the element with the trigger in the trap or its frame the trigger is arranged to lie against a guiding or a holder-on device in the trap in such a way that the trigger takes a small angle to the said element and become by that to be arranged in a pressed position in the trap.

According to still another embodiment of the trap in accordance with the invention, the trigger keeps the trap in the said second position or setting position by resting with one end portion against the bait and with the other end portion or a shaped contact surface against a stop in the frame of the trap, whereby the said element is arranged in a tighened position in the trap and will remove the element out of the tightened position when the bait is consumed or after certain consumption of the bait.

In an additional embodiment of the trap in accordance with the invention the trap is shaped in such a way that the bait-support must be provided with a bait, if the trap shall be able to take the said second position.

Figure 5:
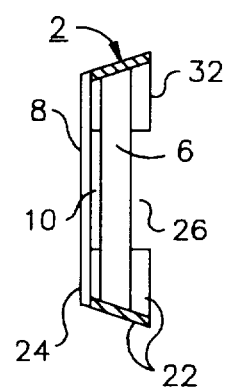
Figure 4:
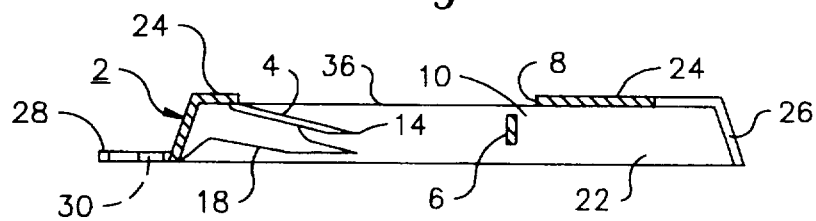
Figure 7:
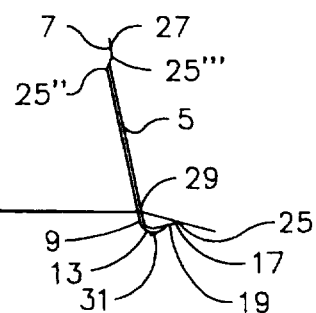
Figure 6:
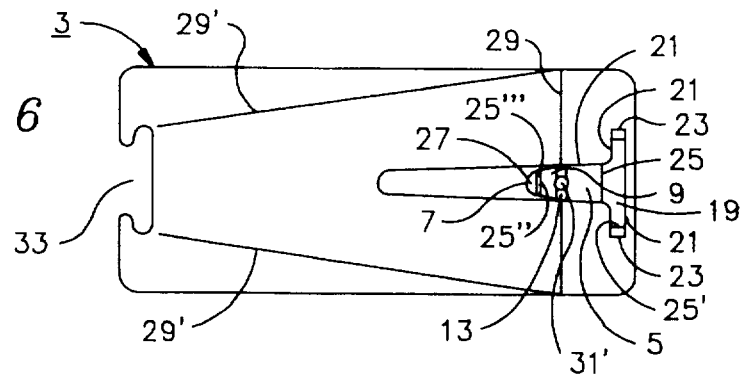
Figure 11:
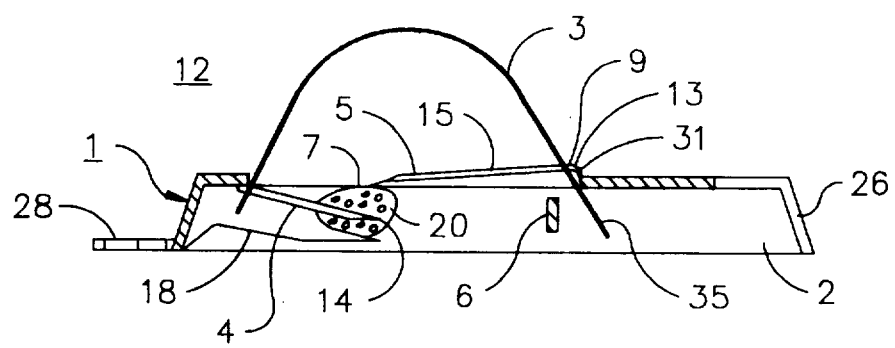
Figure 12:
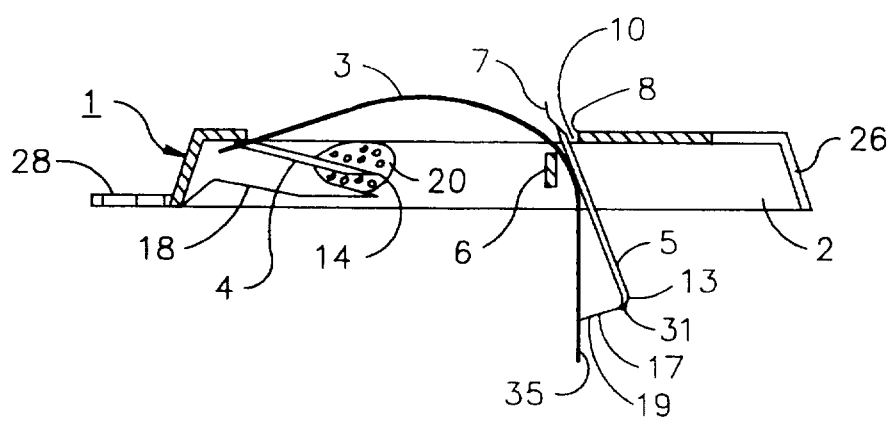
Figure 13:
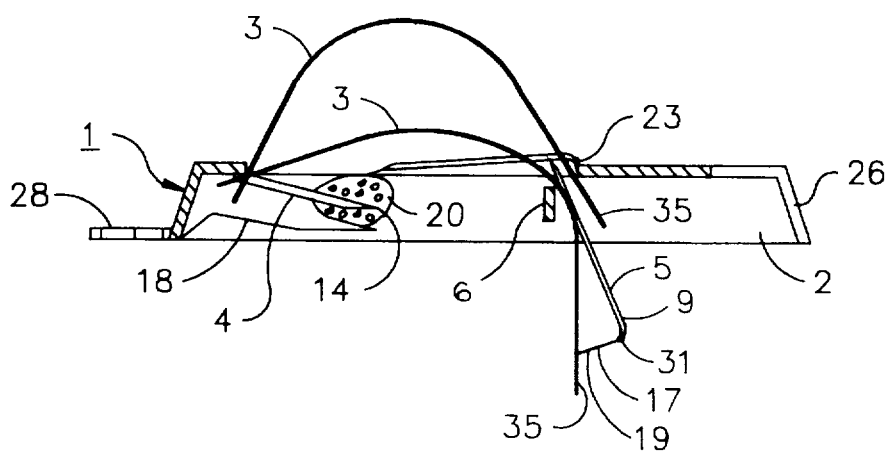

Further characteristics of, and advantages with the trap in accordance with the invention will in the following description of the trap be apparent by embodiment examples, whereby a simultaneous reference will be made to the accompanying schematic drawings, of which FIG. 1 shows from below a holder in form of a base in a trap according to one embodiment, FIG. 2 shows the trap according to section II—II in FIG. 1, FIG. 3 shows from below a holder in form of a base in a trap according to a second embodiment, FIG. 4 shows the trap in FIG. 3 according to section IV—IV, FIG. 5 shows the trap in FIG. 3 according to section V—V, FIG. 6 shows from below a setting element in a trap according to an exemplified embodiment, FIGS. 7 and 7a show from one side the setting element in FIG. 6, FIG. 8 shows from one side and in section a trap, i.e. with the setting element put into the holder and in a first, resting position, FIGS. 9 and 10 show from above and from below respectively a trap according to an additional embodiment, FIG. 11 shows from one side and in section a trap in accordance with the invention, which has been taken a second, setting position, FIG. 12 shows from the same side and in section the trap during setting, i.e. in a position between the said first, resting position and the said second position or setting position. FIG. 13 shows again from the same side and in section the trap according to FIGS. 11 and 12, and FIG. 14 shows from one side and in section a part of a trap at withdrawal from the said second position, i.e. in a position to be released.

Reference designation 1 in FIG. 8 shows a trap in accordance with one embodiment of the invention and in FIGS. 9 and 10 it is also shown a trap in accordance with the invention according to an embodiment of some difference. A trap 1 in accordance with the invention can be shaped of essentially two parts, namely a holder 2 in form of a frame, framework, base or similar and a setting element 3, shield or similar or as it is appears from the embodiment examples of two parts. The holder 2 is meant for and arranged to form a holding device for the said element 3 in the trap 1 and hold the element 3, which besides to form a setting element also forms a killing device in the trap. The trap 1 is arranged to be able to take a first, resting position 11 and at least a second, tightening position 12, see FIG. 11, showing a trap 1 according to still another embodiment.

Besides the said element 3, which will be kept by a holding device, which according to the embodiment examples consists of the said holder 2, the trap 1 comprises a support 4 for bait and a trigger 5.

In FIGS. 1–5 is shown a holder 2 according to two embodiment examples and showing a bait-support 4 for a bait 20, a guiding or holder-on device 6 for a trigger 5, a bar 8 and a slot 10 or opening between the guiding or holder-on device 6 and the bar 8. The bait-support 4 can be shaped as a forked prong with outer end portions 14, each shaped with a point to facilitate baiting and which are located at a distance from one another in such a way that a space 16 or an opening exists in the bait-support 4, through which the trigger 5 can pass when the trap 1 releases. In the holder 2 according to the embodiment example in FIGS. 3–5 there is also existing a holder-on element 18, which is arranged as a holder-on or additional support for certain kinds of baits 20 or baits with more soft consistency, as soft cheese, and forms a basis for the bait 20 in the gap 16 so that the bait will not be forced through the bait-support 4.

The holder 2 shows a lower part 32 or edge, which is meant to rest on a foundation when the trap 1 is used, whereby the foundation can consist of a floor, ground, newspaper, a plate-shaped element, for example a piece of a cardboard or wood, etc. From the lower part 32 a frame-shaped part or a border 22 or the like extends to a shaped top piece 24 or on a level with the underside of the top piece. However, the top piece 24 does not cover the entire upper part of the holder 2 but leave at least an opening 36, through which the element 3 or a part of the element 3 can be brought to take the said second position 12 or a setting position. The bait-support 4 can be arranged to extend from the top piece 24, in which the said bar 8 can be shaped. The guiding or holder-on device 6 is arranged to extend between two opposite portions of the border 22. The holder-on element 18 can be arranged to extend from a front part 34 of the trap 1 or the holder 2 and be shaped as a wing or flange, which is arranged with and starts from a front part of the border 22 and a front part of the top piece 24 and extending on one side or that side of the bait-support 4, which is meant to be turned towards the said foundation and further in an outer portion of the bait-support 4 below the bait-support and the said gap 16 so that a distance is obtained between the bait-support 4 or its outer end portions 14 and the holder-on element 18. Thus, the holder-on element 18 extends from the front part 34 of the holder 2 and from the underside of the bait-support 4 in the direction of and below the gap 16 in the bait-support 4 and further to a vertical plane in the holder 2 for the outer end portions 14 of the bait-support 4 or approximately to the said plane and from there again extends in the direction of the front part 34 of the holder 2 and by a radius connect with the bait-support 4 at or behind the inner end portions of the protruding prong portions. The holder-on element 18 can show a thickness of one or two mm, for example about 1,5 mm.

The border 22 is preferably shaped with such a height that there is room for the bait-support 4 and in applicable cases the holder-on element 18 between the lower part 32 and the top piece 24 of the holder 2, whereby the parts i.a. are protected within outer limiting surfaces or edges of the holder 2.

The holder 2 can show an ear 28, for example in form of a protruding lip with a suspension device or attachment device 30, for example in form of a hole, which lip protrudes from the front part 34 or the border 22 of the trap 1 or holder 2, whereby the suspension or attachment device i.a. can be utilized for suspension of the trap 1 on a peg when exhibiting the trap for sale, in stock-keeping or keeping, when the trap 1 is fastened on a foundation in its use, etc. In one or the other end of the holder 2 is shaped a recess 26 in the holder 2 so that the element 3 can be reached when the trap 1 is handled in setting of the trap.

Besides the said element 3 and trigger 5 so are preferably the remaining and above mentioned parts and means shaped in one piece with the holder 2, which can be shaped of a relatively stiff plastic material.

In FIGS. 6 and 7 are shown an embodiment example of a setting element 3 with a trigger 5 in the form of a setting tongue. The element 3 is shaped substantially as a relatively thin, plate-shaped element of metal, preferably of a stainless material to get quality and weather resistance. The thin metal sheet gets in bending elastic properties. The trigger 5 can be shaped by punching the metal sheet and the reference designations 21 show punchings through the metal sheet to form the trigger 5, whereby it appears from the figures that the trigger 5 is kept at the element 3 in a couple of connections 23 in form of material sections in the element 3 where punching through the element is lacking. The trigger 5 is formed by bending and outwardly flexure of the punched tongue, whereby the trigger show in one end 7 a free end with a shaped first contact surface 27, which shall lie against and can form a plane facing the bait 20 when the trap 1 is set, and a second end 9, which via a bent portion 13 and a second contact surface 17 meant to bear against the holder 2 or its bar 8 in setting, passes into a connecting portion 19 to connect with the element 3. The said second contact surface 17 can in the connecting portion 19 be limited by a folding line 25 and in the direction of the said second end 9 of the trigger 5 by a projection 31, for example in form of a wart, boss, upset or similar or a ridge or back, which passes the bent portion 13 and in the direction of the first mentioned end 7 of the trigger 5, see FIG. 7. The projection 31 is shown in FIG. 6 as an inward bent 31' or the like, as the element 3 is shown from the underside. In the connecting portion 19 can be arranged two additional folding lines 25' in connection with the connections 23. The trigger 5 is bent along additional lines 25" and 25'" in order to arrange the first mentioned end 7 of the trigger 5 as a bent downwards and the first contact surface 27 on a lower level than the extending of the trigger 5 itself or a part 15 of the trigger 5.

In one end of the element 3, it is arranged a recess 33 or an opening as an attachment part with the holder 2 or its bait-support 4. A portion of the other end of the element 3 will in the trap 1 be in the said recess 26 in the holder 2 and forms a press spot 35 or a press surface on the element 3.

Straight across the element 3 in the said second end of the element, the element 3 is bent in a folding line 29. The angle a between the two divided planes of the element 3 and divided by the folding lines 29 forms a sliding angle. The sliding angle a and the height h of the projection 31 co-operates and settle the moment of setting of the trap 1, see FIG. 7a. The height h on the projection 31 in relation to the sliding angle a co-operates for the release of the trap 1.

The element 3 can be provided with still a couple of bendings, as it is shown by the folding lines 29', which according to an embodiment example extends divergent from principally the recess 33 or opening and between the recess 33 and the side edges of the element 3 in the area of the previously mentioned folding line 29. The bendings, which are represented by the folding lines 29', can form stiffenings in the element 3, which can be necessary if the trigger 5 is made longer and/or when using material of lower quality. Because of the punching 21 for cutting the trigger 5 in the element 3, the element will have a delicater elasticity which, thus can make the bendings necessary but will also involve that they are arranged to extend divergent. The side edges of the element 3 will, by the existence of the bendings, be angled downwards in the trap 1 in some extent and in the area for the bendings which can make the killing of the vermin more efficiently.

In the said FIGS. 8–10 is shown an element 3 which is arranged in a holder 2 to form a trap 1. In this case the element 3 is arranged with its attachment portion 33 on the bait-suport 4 of the holder 2 and is brought to extend through the said opening 10 of the holder 2 and with the trigger 5 resting on one side or an upper side of the guiding and holder-on device 6, whereby the first mentioned free end 7 of the trigger 5 will pass beyond the guiding or holder-on device 6 in its extension, i.e. the folding line 25" will rest on or at a distance from the upper edge of the guiding or holder-on device 6, which is turned in the direction of the bait-support 4. The trigger 5 will, by the arrangement of the element 3 in the holder 2, be elastically pressed and rest with spring-force against the guiding and holder-on device 6, as it appears from, for example, FIGS. 8 and 10. In addition and by means of the projection 31 in form of a ridge or the like, the trigger 5 lie against the top piece 24 of the holder 2 and in connection with the recess 26 in the holder 2 and with a part in front of the said bent portion 13 of the trigger 5, whereby the bent portion 13 and the projection 31 extend in the said recess 26 in the holder 2. When the trap 1 is provided with a holder-on element 18, which connects with the bait-support 4, as shown by the trap 1 according to the embodiment in FIG. 11, the attachment portion 33 of the element 3 is shaped as shown in FIG. 6, i.e. with an opening in form of a recess for the sake of the fact that the element 3 shall be able to be attached and catch the bait-support 4 which, thus also forms a holder or an attachment part for the element 3 according to the embodiment examples shown.

When the element 3 is arranged in the holder 2, the element 3 covers the opening 36 in the holder 2 and by this the element also covers the bait-support 4 and in applicable cases the holder-on element 18 and a bait 20, if a bait is arranged to the bait-support 4 a period before the trap 1 is set or when the trap 1 is arranged in the said second position 12 of the trap 1, i.e. by tightening the element 3. Thus, the trap 1 can be baited before the trap is set, for example at another place than the trapping place, before that the trap is set out, etc. or even before delivery or sales of the trap.

When the trap 1 shall be brought from the first, resting position, as is before us according to FIGS. 8–10, to a second, tightening or setting position, as it appears from, for example, FIG. 11, the element 3 is brought, preferably by means of a hold of a thumb on the press spot 35 on the element, to be bent downwards, as it is evident from FIG. 12, and then be brought upwards through the opening 10 of the holder 2 with a part of the trigger 5 so that the projection 31 of the trigger 5 will be placed above the top piece 24 and the stop 8 of the holder 2, after which the element 3 is slacken in some extent so that the projection 31 will rest on the stop 8 of the holder 2. At this, the first mentioned and free end 7 of the trigger 5 will lie with the first contact surface 27 against a bait 20 placed on the bait-support 4, see FIG. 11, whereby the trap 1 is set or arranged in the said second position 12 of the trap 1. The other contact surface 17 of the trigger 5 or the element 3 will lie against the stop 8 of the holder 2. At this, the element 3 has adopted a bent shape or a curve and thus been brought to a tightened position and for the trap 1 releasable position.

Thus, the trap 1 is kept in the said second position or the element 3 in the bent and tightened position by the contact of the first mentioned end 7 of the trigger 5 against the bait 20 and the contact of the second contact surface 17 against the stop 8 or the resting or hooking of the projection 31 against, above or with the stop 8. The height h and the sliding angle a of the projection 31 is a determining factor for the firmness of the set of the trap 1 until the trap 1 releases by the fact that the bait 20 after a while is reduced by the consumption of the bait of the vermin. To this, the curved free end 7 of the trigger 5 has signification by the moving distance which, at this is attained. When the trap 1 is set, i.e. when the element 3 is brought from the first position of the trap 1 and to the second position 12 of the trap 1, the guiding or holder-on device 6 guides the element 3 and the trigger 5 to the intended positions by the pressing and the displacement of the element 3. Besides as a holder-on device for the trigger 5 in the first position 11 of the trap 1, the guiding and holder-on device 6 is acting as a holder-on, when the element 3 is brought to the downwards bent position when the trap is set, as is evident from FIG. 12.

Preferably, a trap 1 in accordance with the invention is shaped in such a way or the traps 1 according to the embodiment examples are shaped in such a way, that the trap 1 must be baited to be able to be set, i.e. that the bait-support 4 must be provided with a bait 20 for the reason that the trap 1 will be able to take and remain in the said second position 12 or that the the said setting element 3 shall be kept in a tightened and later on in a releasable position.

The first mentioned end 7 of the trigger 5 will be lowered when the bait 20 is removed. The vermin consuming the bait 20 stretch into the trap 1 between the bent, tightened element 3 and the edging 22 of the holder 2, i.e. into the opening 36. In order to release the trap 1, the trigger 5 or the said part 15 of the trigger 5 shall be lowered and the end part or the first mentioned end 7 of the trigger 5 pass the upper surface of the bait-support 4 or through the bait-support 4. By the lowering of the trigger 5 and the change in position, the projection 31 is not capable of holding the element 3 in the tightened position but slides by the stop 8 and the trap 1 releases by the fact that the element 3 immediately strives to return to its position of origin, i.e. to the said first, resting position 11. According to one embodiment of the trap 1 in accordance with the invention, the trap 1 shall release at the latest when the trigger 5 or its said end part 7 has passed the bait-support 4 or as it appears from FIG. 14. Before the said first end 7 or first contact surface 27 of the trigger 5 has passed through the bait-support 4 or the upper surface of the bait-support 4, the trap 1 must remain set in a stable way, which can be secured by adjustment or correction of the trap and a simple test, which can be carried out by everyone. Such a test can consist of the fact that a set trap is allowed to fall with its bottom edge 34 hitting a plane, solid basis, as a table, and from a height of 100–150 mm, whereby the trap shall not be released. However, the trap should or shall release in a fall from a height of 250 mm.

When the trap 1 releases the vermin will be exposed to a shock making the vermin unconscious of the serious situation for the animal simultaneously as the element 3 will hit the animal unconscious and its vertebral column will be broken in or adjacent to atlas, which makes an immediate killing which, besides in unbloody. The trap 1 can be shaped in such a way that it kills by the fact that the vertebral column of the animal is broken in or near to atlas, which can be done by dimensioning of the trap 1, as to take into consideration the distance between the bait 20 or the bait-support 4 and the border 22 of the holder 2 along the side edges of the holder, and further that the element 3 shows a width, which substantially corresponds with the width of the holder 2. Each vermin irrespective of species and age has a certain length or distance from atlas and to the mouth and therefore, the animal will have atlas in the area for the border 22 of the trap 1 or just inside the border or in the area for the side edge of the element 3. The killed vermin is kept in the trap 1 between the upper edge of the holder 2 or its border 22 and the element 3.

By the fact that the vermin is killed immediately when a trap 1 in accordance with the invention releases, there exists no risk for that the vermin shall move the trap in an attempt to escape the danger. In order to prevent that other animals catch the trapped animal and by that remove the trap or that the trap when it is set out is moved by, for example, wind, the trap 1 can be anchored in the foundation by means of an anchoring device, which is arranged to the ear 28 of the trap 1, for example an anchoring device in form of a string, a so-called bag-rivet, if the trap is arranged in a newspaper, a nail and by that maybe for a more permanent placing of the trap.

In order to prevent that other animals, for example small birds accidently will come in contact with the trap with the risk that the trap releases, the trap 1 can be placed under a newspaper or the first page of a newspaper. The vermin will still find the bait 20 and by that the trap 1. In this case the newspaper can be used as a wrapping when the trap 1 is examined and as a package for the killed vermin.

Without exceeding the scope of the concept of the invention, modifications of the trap in accordance with the invention should be possible. Thus, the trap can be arranged to release earlier than what has been shown and described in connection with the embodiment examples and be shaped with more parts or of more parts than what have been evident by the embodiment examples. The holder and by that also the setting element can be shaped with another configuration. For example, the bait-holder can be shaped as a sleeve, in which bait is arranged and by that with a shaping making the bait difficult of access for the vermin. The sleeve is arranged turnable on a shaft or similar in the holder, for example the previous bait-support is shaped as a holder or an axle for the sleeve, which shows a heel or the like, in which an opening or a groove exists, as a gap for the possibility of the trigger to pass the heel. When setting, the trap can be held upside down, whereby the sleeve turns in a setting position and one does not need to handle or hold the sleeve during setting. In this case, the trigger is brought to rest on the heel next to the groove. The sleeve will turn on the shaft by the intense work of the sleeve by the vermin in order to reach the bait and the trigger will land right in front of the groove and can pass the upper surface of the heel and the trap releases. The sleeve can be arranged detachable in the holder. The sleeve or another body can consists of a plastic material which smells and tempt the vermin in the same way as an ordinary bait, whereby the trap does not even need to be baited for use. The opening in the holder between the guiding and holder-on device and the bar can be wider, for example by displacement of the guiding and holder-on device some in the direction of the front part of the trap or holder. The bar can instead for being an end edge of the top piece be shaped as a separate means or, for example, as a catching device, a lip or by giving the edge another shaping, etc. The first mentioned end of the trigger can be arranged in a smaller angle with the extension of the trigger so that the first contact surface of the trigger will be angled against the bait and by that, if necessary, move the bait in the direction of the bait-support. Namely, it should be possible that the trigger, which rests on the bait with elastic force, with its said, free end presses the bait from the bait-support, when the bait is eaten. Further, the trigger can, as said, be shaped longer or in such a way that it will be located closer to the bait-support in the said first, resting position of the trap and maybe even reaches or almost reaches the bait-support or its outer end. The attachment portion can instead of a recess consists of an opening, when the holder or the trigger lacks a holder-on device, for example as it appears from the embodiment according to FIG. 10. The trap is thus not restricted to what has been shown in the embodiment examples shown and described but soley by the claims hereinafter.

I claim:

1. A trap for small vermin such as mice, comprising a support (4) for bait, holder means (2) for holding a setting element (3) of an elastic material and a trigger (5), which is connected with the said setting element (3) and arranged in the trap (1) at a distance from the bait-support (4), whereby the trap (1) is able to take a first, resting position and a second, tightened position, the trigger (5) being able, when the trap is in said first position, to be moved in the direction towards the bait-support (4) to enable the trap to take its second position, whereby the trigger (5) is arranged with an end (7) which is able to overlap an outer end (14) of the bait-support (4) in the said second position of the trap, and in that the said element (3) is able to be kept in a tightened position in the said second position (12) of the trap, wherein said end (7) of the trigger (5) is shaped to lie against the bait (20) in the said second position (12) of the trap and wherein the other end (9) of the trigger (5) passes via a bent portion (13) into a connecting portion (19) having a contact surface (17) arranged to bear against holder (2) in the said second position (12) of the trap.

2. A trap in accordance with claim 1, in which the said contact surface (17) has a projection (31) arranged to rest against said holder means (2), when the trap is in the said second position (12).

\* \* \* \* \*